Oct. 20, 1931.  M. BARTUS  1,828,639
RAIL JOINT
Filed April 10, 1931  2 Sheets-Sheet 1
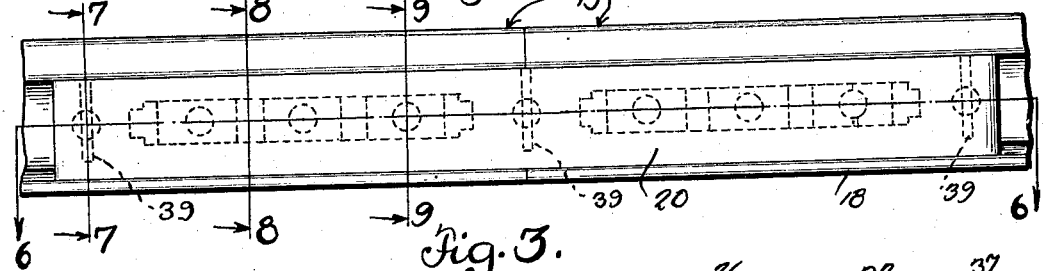
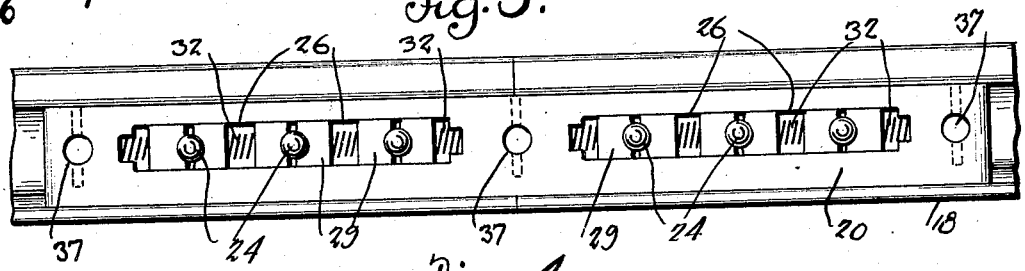
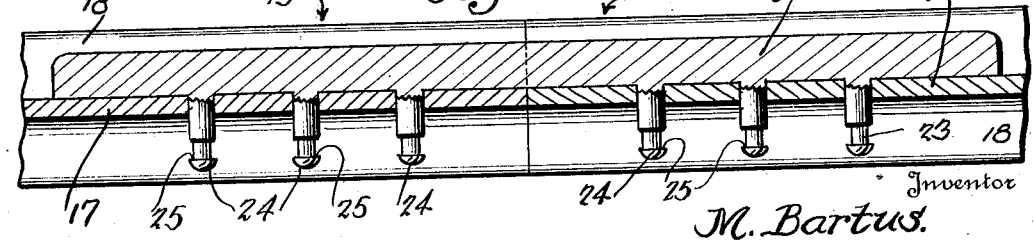
Inventor
M. Bartus.
By Bryant & Lowry
Attorneys Oct. 20, 1931.  M. BARTUS  1,828,639
RAIL JOINT
Filed April 10, 1931  2 Sheets-Sheet 2
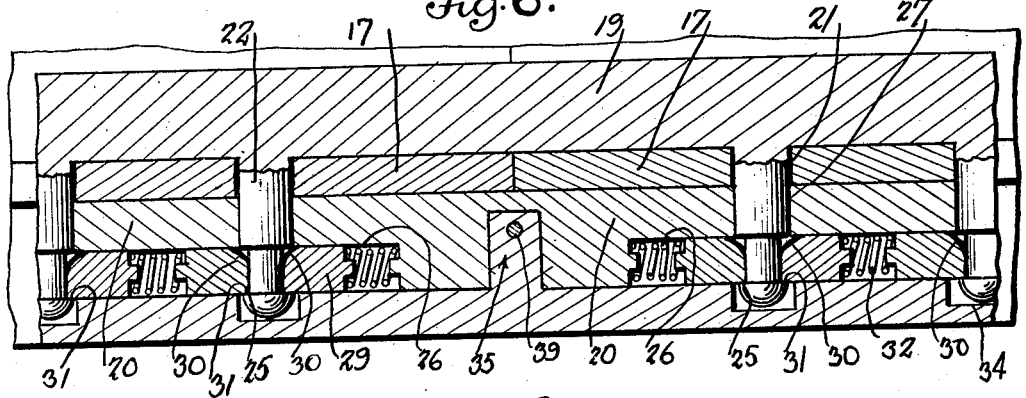
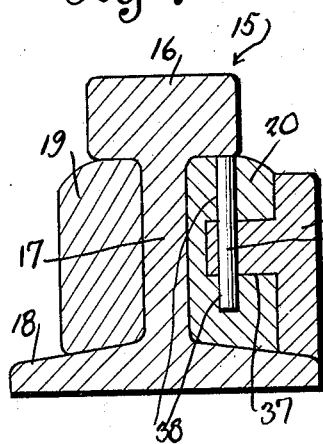
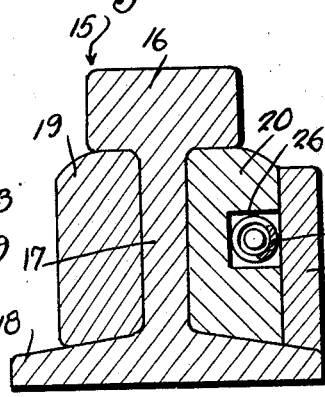
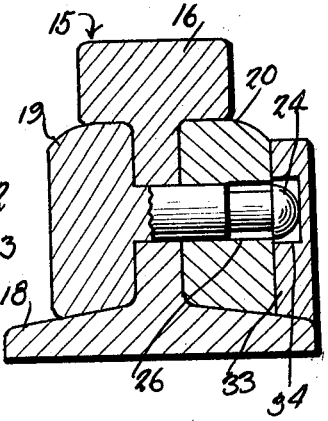
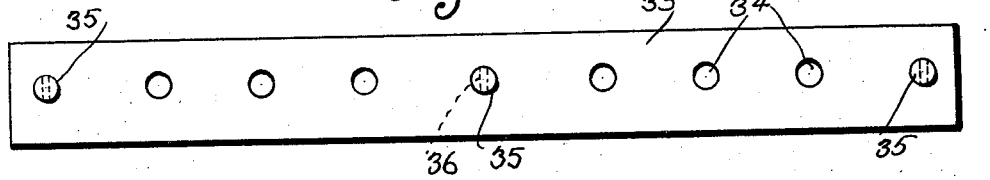
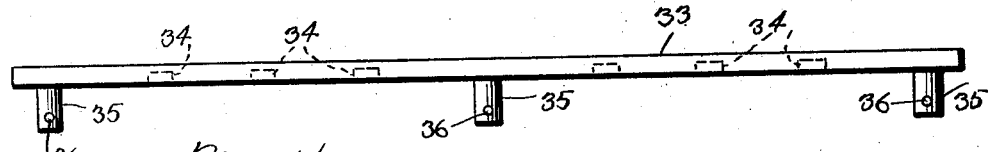
Inventor
M. Bartus
By Bryant K. Lowry
Attorneys Patented Oct. 20, 1931

1,828,639

UNITED STATES PATENT OFFICE

MIKE BARTUS, OF HARRISON CITY, PENNSYLVANIA

RAIL JOINT

Application filed April 10, 1931. Serial No. 529,227.

This invention relates to certain new and useful improvements in rail joints.

The primary object of the invention is to provide a rail joint wherein fish plates engaged with opposite edges of the webs of meeting rail ends are interlockingly engaged with each other with a covering plate or bar for the interlocking connection preventing access thereto, the meeting rail ends being retained in assembled relation against accidental separation.

A further object of the invention is to provide a rail joint of the foregoing character wherein the cover plate or bar associated with the interlocking connections between the fish plates has an interlocking connection with the fish plate with which the same is associated with the last named interlocking connection so disposed with respect to the meeting rail ends as to be inaccessible so that the fish plates are permanently attached to the meeting rail ends.

With the above and other objects in view that will become apparent as the nature of the invention is better understood, the same consists in the novel form, combination and arrangement of parts hereinafter more fully described, shown in the accompanying drawings and claims.

In the drawings:—

Figure 1 is a top plan view of a rail joint constructed in accordance with the present invention;

Figure 2 is a side elevational view;

Figure 3 is a side elevational view with the cover bar for one of the fish plates removed to show the interlocking connection between the fish plates at opposite sides of the meeting rail ends;

Figure 4 is a side elevational view showing the locking pins carried by one fish plate projecting through the webs of the meeting rail ends with the cooperating fish plate and lock bar removed;

Figure 5 is a horizontal longitudinal sectional view taken on line 5—5 of Figure 4;

Figure 6 is a horizontal longitudinal sectional view taken on line 6—6 of Figure 2, showing the spring latches carried by one fish plate engaged with the headed ends of latch pins laterally projecting from the fish plate at the opposite sides of the meeting rail ends and projecting through the webs of the rails;

Figure 7 is a cross-sectional view taken on line 7—7 of Figure 2 showing the lock means for the cover bar that overlies the interlocking connection between the fish plates positioned for inaccess beneath the ends of the rails;

Figure 8 is a cross-sectional view taken on line 8—8 of Figure 2;

Figure 9 is a cross-sectional view taken on line 9—9 of Figure 2;

Figure 10 is an inner face view of the cover plate or bar for the fish plate connecting means; and Figure 11 is an edge elevational view of the cover bar.

Referring more in detail to the accompanying drawings, the reference numeral 15 designates meeting rail ends, each of which comprises the usual ball or tread 16, a web 17 and base flanges 18, the meeting rail ends being disposed in end abutting relation with fish plates 19 and 20 engaged respectively with opposite sides of the web 17 and located between the head and base flanges of the rail ends, and overlapping the meeting ends thereof as illustrated.

The web portion 17 of each rail end has a series of horizontally alined spaced openings 21 provided therein through which latch pins 22 projecting laterally from the inner face of the fish plate 19 extend, the projecting ends of the latch pins 22 outwardly of the rail webs 17 being annularly reduced as at 23 to provide end hemispherical heads 24 defining inner catch shoulders 25.

The fish plate 20 positioned at that side of the rail webs 17 opposite the fish plate 19 is provided with spaced longitudinally extending depressions or pockets 26 and the bottom walls of said pockets are provided with spaced openings 27 alined with the openings 21 in the rail webs 17 for the passage of the latch pins 22, the annularly reduced portions 23 being located in the fish plate pocket 6. Spring latches mounted in the pockets 26 are engaged in the annularly reduced portions 23 of the latch pins and the shoulders 25 of the latch pin head 24 as shown more clearly in Figures 3 and 6, the latches 29 being arranged in pairs, each latch having a beveled nose 30 and a catch shoulder 31 with a coil spring 32 interposed between the latches of adjacent pairs, and also between the outer end latches and the outer end walls of the pockets 26 as illustrated, the coil springs 32 causing the latches 29 of each pair to be moved in directions toward each other.

A cover bar 33 overlies the pocketed side of the fish plate 20, and as shown in Figures 6 to 11, the cover bar 33 is provided with spaced horizontally alined sockets 34 to receive the headed ends 24 of the lock pins 22 while a series of pins 35 laterally projecting from the socketed sides of the lock bar 33 and having transverse openings 36 in the free ends thereof are adapted to be received in openings 37 provided in the fish plate 20 with the pin openings 36 alined with vertical openings 38 provided in the fish plate 20 above and below the opening 37 for the pins 35. A lock pin 39 is inserted through the registering openings 38 and 36 in the fish plate 20 and cover bar pins 35 for retaining the cover bar in position on the fish plate 20.

In assembling the fish plates 19 and 20 on the meeting rail ends 15, the fish plate 19 is first located with the pins 22 thereof projected through the opening 21 in the rail webs 17. The lock bar 33 is then engaged with the fish plate 20 and retained thereto by the pins 39, the upper ends of the pins 39 terminating flush with the upper face of the fish plate 20 as illustrated. The fish plate 20 is then positioned to receive the projecting ends of the latch pins 22, the beveled noses 30 of the latches 29 riding over the rounded head 24 of the latch pin with the catch shoulder 31 of the latches 29 engaged with the shoulders 25 of the latch pin head 24 and retained in the annularly reduced portions 23 by the coil springs 32, the fish plate 20 when so positioned having the upper ends of the lock pins 39 with the cover bar 33 disposed beneath the tread 16 of the rail ends as shown in Figure 7, the fish plate then being locked on the rail ends against displacement.

From the above detailed description of the invention, it is believed that the construction and operation of the invention will at once be apparent, and while there is herein shown and described the preferred embodiment of the invention, it is nevertheless to be understood that minor changes may be made therein without departing from the spirit and scope of the invention as claimed.

I claim:—

1. In a rail joint of the character described, meeting rail ends, a fish plate at each side thereof, headed pins carried by one fish plate extending through the rail webs, spring latches carried by the other fish plate for interlocking engagement with the headed pins, and means to prevent access to the pins and latches with the fish plates retained in assembled relation on the rail ends.

2. In a rail joint of the character described, meeting rail ends, a fish plate at each side thereof, headed pins carried by one fish plate extending through the rail webs, spring latches carried by the other fish plate for interlocking engagement with the headed pins, means to prevent access to the pins and latches with the fish plates retained in assembled relation on the rail ends, including a cover bar for the interlocking connection, and retaining means for the cover bar positioned for inaccess thereto.

3. In a rail joint of the character described, meeting rail ends, a fish plate engaged with opposite sides of the rail ends, lateral latch pins carried by one fish plate extending through the rails, spring latches in the other fish plate engaged with the projected end of the latch pins, and a cover bar overlying the latch connections and attached to the last named fish plate.

4. In a rail joint of the character described, meeting rail ends, a fish plate engaged with opposite sides of the rail ends, lateral latch pins carried by one fish plate extending through the rails, spring latches in the other fish plate engaged with the projected end of the latch pins, and a cover bar overlying the latch connections and attached to the last named fish plate, a shoulder on each latch pin, and a bevelled nose on each latch permitting assembly of the pins and latches and preventing separation thereof.

5. In a rail joint of the character described, meeting rail ends, a fish plate engaged with opposite sides of the rail ends, lateral latch pins carried by one fish plate extending through the rails, spring latches in the other fish plate engaged with the projected end of the latch pins, a cover bar overlying the latch connections and attached to the last named fish plate, the connection between the fish plate and cover bar including the provision of sockets in the fish plate, and plugs on the bar received in the sockets and pins extending through the fish plate and plugs occupying positions beneath the rail tread when assembled to prevent removal of the cover bar.

6. In a rail joint of the character described, meeting rail ends, a fish plate engaged with opposite sides of the rail ends, lateral latch pins carried by one fish plate extending through the rails, spring latches in the other fish plate engaged with the projected end of the latch pins, a cover bar overlying the latch connections and attached to the last named fish plate, a shoulder on each latch pin, a bevelled nose on each latch permitting assembly of the pins and latches and preventing separation thereof, the connection between the fish plate and cover bar including the provision of sockets in the fish plate and plugs on the bar received in the sockets and pins extending through the fish plate and plugs occupying positions beneath the rail tread when assembled to prevent removal of the cover bar.

In testimony whereof I affix my signature.

MIKE BARTUS.